United States Patent [19]
Miller et al.

[11] Patent Number: 5,978,814
[45] Date of Patent: Nov. 2, 1999

[54] NATIVE DATA SIGNATURES IN A FILE SYSTEM

[75] Inventors: Thomas J. Miller; Luis Felipe Cabrera, both of Bellevue, Wash.

[73] Assignee: Microsoft Corporation, Redmond, Wash.

[21] Appl. No.: 09/010,097

[22] Filed: Jan. 21, 1998

[51] Int. Cl.$^6$ ................................................ G06F 17/30
[52] U.S. Cl. ................................................ 707/203
[58] Field of Search ............................................ 707/203

[56] References Cited

U.S. PATENT DOCUMENTS

| | | | |
|---|---|---|---|
| 5,226,154 | 7/1993 | Kondoh | 707/204 |
| 5,454,101 | 9/1995 | Mackay et al. | 707/10 |
| 5,488,702 | 1/1996 | Byers et al. | 395/186 |
| 5,590,318 | 12/1996 | Zbikowski et al. | 707/202 |
| 5,720,026 | 2/1998 | Uemura et al. | 395/182.04 |
| 5,812,793 | 9/1998 | Shakib et al. | 395/200.31 |
| 5,828,885 | 10/1998 | Raman | 395/705 |
| 5,832,487 | 11/1998 | Olds et al. | 707/10 |

OTHER PUBLICATIONS

CAE Speciication System Management: Data Storage Management (XDSM) API, published by *The Open Group*; Feb. 1997.

*Primary Examiner*—Jack M. Choules
*Attorney, Agent, or Firm*—Workman, Nydegger, Seeley

[57] ABSTRACT

The present invention provides reliable systems and methods for rapidly determining whether file data streams are the same, or different, without having to make a comparison between the actual data streams. If the determination is made that the data streams are different, the present invention can rapidly determine where the changes between the data streams occur, again, without having to actually compare the entire size of the data streams. Such methods and systems are accomplished by generating a native data signature (NDS) for each data stream stored by the file system, wherein each NDS is substantially smaller in size as compared to the data stream corresponding thereto. The NDS is generated by separating the data stream into a plurality of allocation units, ranging in size from 4K bytes to 256K bytes; by generating a unique change identifier (UCI), one per each allocation unit; and by assembling the UCIs into a series of bits, typically ranging up to, and including, 64 in number. Thus, even with a UCI having 64 bits, time efficiency for comparing data streams by comparing between NDSs is improved on the order of 500:1 or 32,000:1, depending upon the size of the allocation unit.

23 Claims, 6 Drawing Sheets

NATIVE DATA SIGNATURES IN A FILE SYSTEM

BACKGROUND OF THE INVENTION

1. The Field of the Invention

The present invention relates to systems and methods for comparing file data streams in a file system. More specifically the present invention allows a file system to rapidly compare file data streams, without making actual comparisons between the data streams, by comparing between native data signatures generated for each data stream.

2. The Prior State of the Art

In a computer operating system, a file system is generally known as the overall structure in which files are named, stored and organized. In the early 1980's, the FAT (file allocation table) file system was developed for use with MS-DOS (MICROSOFT disk-operating-system) on the first generation of personal computers. The computers generally had two drives for low-density floppy disks and the FAT system performed more than adequately in managing the small disk volumes and the hierarchical directory of the structures and files. Over time, the FAT system even continued to keep pace with the needs of personal computer users as computer hardware and software increased in power and speed. However, as the low-density floppy disks began yielding to larger hard disk drives, file data searches and retrievals were correspondingly slowed down in time.

By the end of the decade, further deficiencies were observed with the FAT system. For example, as the hard disks of personal computers evolved into 40 MB or more, users were required to partition their disks into two or more volumes because the FAT system was limited to 32 MB per volume. Later versions of MS-DOS, however, did allow for larger disk volumes.

Eventually, as hard disks grew even larger, a high-performance file system (HPFS) was introduced as part of a new operating system, OS/2, to more efficiently manage the large volumes on hard disk. The HPFS found speed advantage over the prior FAT system by: (1) reserving sector space for booting, maintaining and recovering the file system; (2) reserving bitmap space at selected intervals throughout the disk to help prevent fragmented file storage; and (3) by its use of "B-Tree" root and nodal hierarchical structure that allowed for fast traversal of stored file data. The HPFS even allowed for increased in the size of file names from an eight-plus-three character format, used by the FAT system, to 255 characters. The longer file names enabled longer, descriptive names to be employed.

While both the HPFS and the FAT system were introduced a relatively long time ago in a rapidly changing computer industry, both steadfastly remain popular file systems, and because of their speed and versatility, continue to be extensively used. But file management limitations still, nonetheless, exist with both the HPFS and the FAT systems.

For example, in today's computer industry, numerous sophisticated applications demand near zero-fault data transactions to occur at substantially instantaneous speeds. Such applications include transactions in the national and world financial markets, airline industry, banking industry and in various engineering and scientific applications, to name but a few. While numerous variables are involved in the pursuit of instantaneous and zero-fault tolerance transactions, today's computer world welcomes any advantages in speed and accuracy, even at the most rudimentary levels. In fact, there are times when such transactions simply reduce to determinations about particular characteristics of data streams stored in files. For example, determinations ascertaining whether stored data has changed or remains the same is often times enough to make a difference in how rapidly or effectively a transaction occurs. With the FAT and HPFS systems, such determinations are performed by comparing between two or more data streams on a one-to-one, i.e., bit-to-bit/byte-to-byte, basis.

While both the FAT and HPFS systems are able to efficaciously make data stream determinations, neither are particularly well suited for these types of applications because valuable time is consumed in comparing data streams one-to-one. This is especially true with applications involving extremely large data streams. Consequently, it is desirable to make faster, time-saving comparisons between data streams while maintaining, or improving, accuracy.

A further limitation is that often times valuable storage space is wasted when old files are updated with new data and then the old files are "backed-up" again to reflect the new data. While the new data changes many have only been minimal, or trivial, in amount, the backed-up file has repeated the storage of much of the same data as before the entry of the new data. Thus, it would be desirable to have a system and method whereby only actual changes in file data are backed-up instead of repeatedly storing redundant file data.

Yet another problem is that the prior art file and operating systems are relatively deterministic and cannot now be easily extended to cover scenarios not envisioned by its designers. As such, attempting to incorporate another method or file system into the operating system to facilitate the described sophisticated file management needs, would be difficult, if not impossible. It would therefore be desirable to provide systems and methods that can be fully assimilated into developing file and operating systems while simultaneously contemplating and providing for future file management utilities not yet fully developed or envisioned.

SUMMARY AND OBJECTS OF THE INVENTION

The foregoing problems in the prior state of the art have been successfully overcome by the present invention, which is directed towards systems and methods for effectuating rapid comparisons of file data streams, without making actual comparisons between the data streams. Comparisons are, instead, made between native data signatures generated for each data stream. The present invention is particularly useful for rapidly determining, both, whether a data stream has been changed and, if changed, the location within the data stream at which the change(s) occurred. Particular file management applications able to benefit from the present invention include file recovery, storage, updating and data redundancy and many other similarly related sophisticated applications.

In one embodiment, the present invention generates native data signatures (NDS) for making comparisons between two or more data streams stored on a disk by: first, separating a data stream into individual storage allocation units; second, generating a unique change identifier (UCI), one per each allocation unit; and third, assembling each of the UCIs into a corresponding NDS. Thus, the data stream remains uniquely identified, but instead of being represented in a size equivalent to the storage size of the actual data stream, the data stream is represented in a significantly smaller proportion. As such, faster data stream comparisons can then be made by comparing between native data signatures, instead of comparing the actual data streams on a one-to-one-basis. In one embodiment, the allocation units range in size from 4K bytes to 256K bytes and the UCIs are as large as 64 bits. Thus, even if the UCI is a full 64 bits in length, the time of comparing data streams, by way of NDSs, is improved on the order of 500:1 or 32,000:1, respectively, depending upon which size allocation unit is employed.

When changes occur in a data stream, only the allocations units corresponding to the changed data are updated, in turn, causing only the UCI corresponding to that updated allocation unit to be updated. As such, when determining where changes occurred in a data stream, the file system need only determine which UCI has changed. Consequently, storage space waste is also reduced by the present invention because a NDS identifies, by way of the updated UCIs, those areas of the file that have been changed and it is only necessary, therefore, to back-up the hanged data areas of the file and not the entire file.

Additional advantages of the invention will be set forth in the description which follows, and in part will be obvious from the description or may be learned by the practice of the invention. The advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
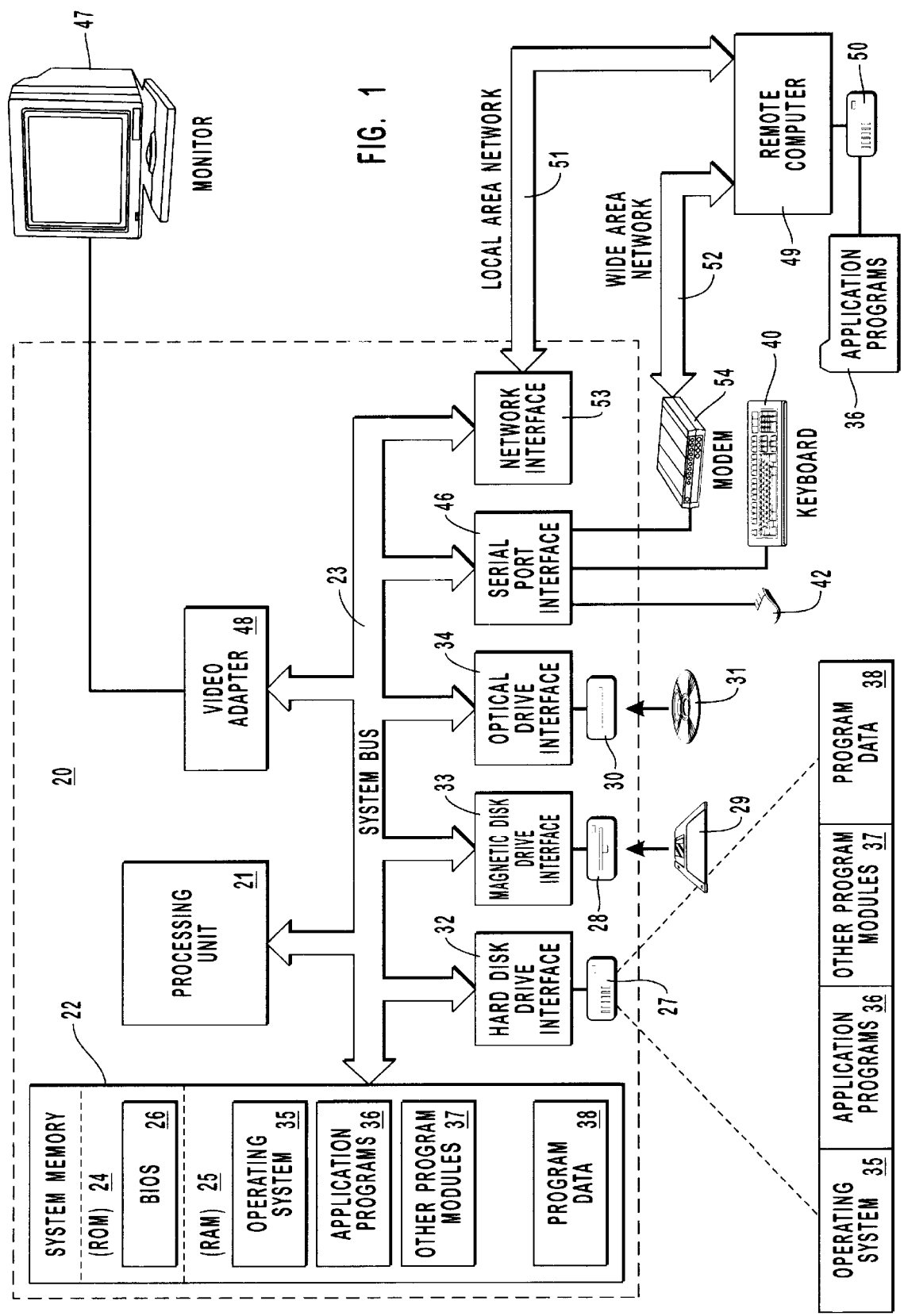
FIG. 1 is an example system that provides a suitable operating environment for the present invention.

The present invention provides systems and methods for rapidly comparing file data streams, without making actual comparisons between the stored data streams. In accordance with the present invention, comparisons of stored data streams are made, as taught herein, by comparing native data signatures generated for each of the data streams stored by operation of the file system as part of the computer operating system. The native data signatures, it should be appreciated, are shortened size representations of the actual data streams and, therefore, comparisons of the native data signatures lend themselves to faster computation times as opposed to a complete comparison between the full lengths of the actual data streams.

In accordance with the present invention, diagrams are used herein to illustrate either the structure or processing of embodiments used to implement the system and method of the present invention. Using the diagrams in this manner to present the invention, however, should not be construed as limiting of its scope but merely as representative. As discussed in greater detail below, the embodiments of the present invention may comprise a special purpose or general purpose computer comprising various computer hardware.

Embodiments also within the scope of the present invention include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic disk storage devices, or any other medium which can be used to store the desired executable instructions or data fields and which can accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Further contemplated are a hierarchy of storage devices that are available to the system. Such storage devices may comprise any number or type of storage media including, but not limited to, high-end, high-throughput magnetic disks, one or more normal disks, optical disks, jukeboxes of optical disks, tape silos, and/or collections of tapes or other storage devices that are stored off-line. In general, however, the various storage devices may be partitioned into two basic categories. The first category is local storage which contains information that is locally available to the computer system. The second category is remote storage which includes any type of storage device that contains information that is not locally available to a computer system. While the line between these two categories of devices may not be well defined, in general, local storage has a relatively quick access time and is used to store frequently accessed data, while remote storage has a much longer access time and is used to store data that is accessed less frequently. The capacity of remote storage is also typically an order of magnitude larger than the capacity of local storage.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, computer clusters mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/out system (BIOS) 26, containing the basic routines that help to transfer information between elements within the computer 20, such as during start-up, may be stored in ROM 24. The computer 20 may also include a magnetic hard disk drive 27 for reading from and writing to a hard disk, not shown, a magnetic disk drive 28 for reading from or writing to a removable magnetic disk 29, and an optical disk drive 30 for reading from or writing to removable optical disk 31 such as a CD-ROM or other optical media. The hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite disk, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, computers typically include other peripheral output devices (not shown), such as speakers and printers.

The computer 20 may operate in a networked environment using logical connections to one or more remote computers, such as remote computer 49. Remote computer 49 may be a personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 2:
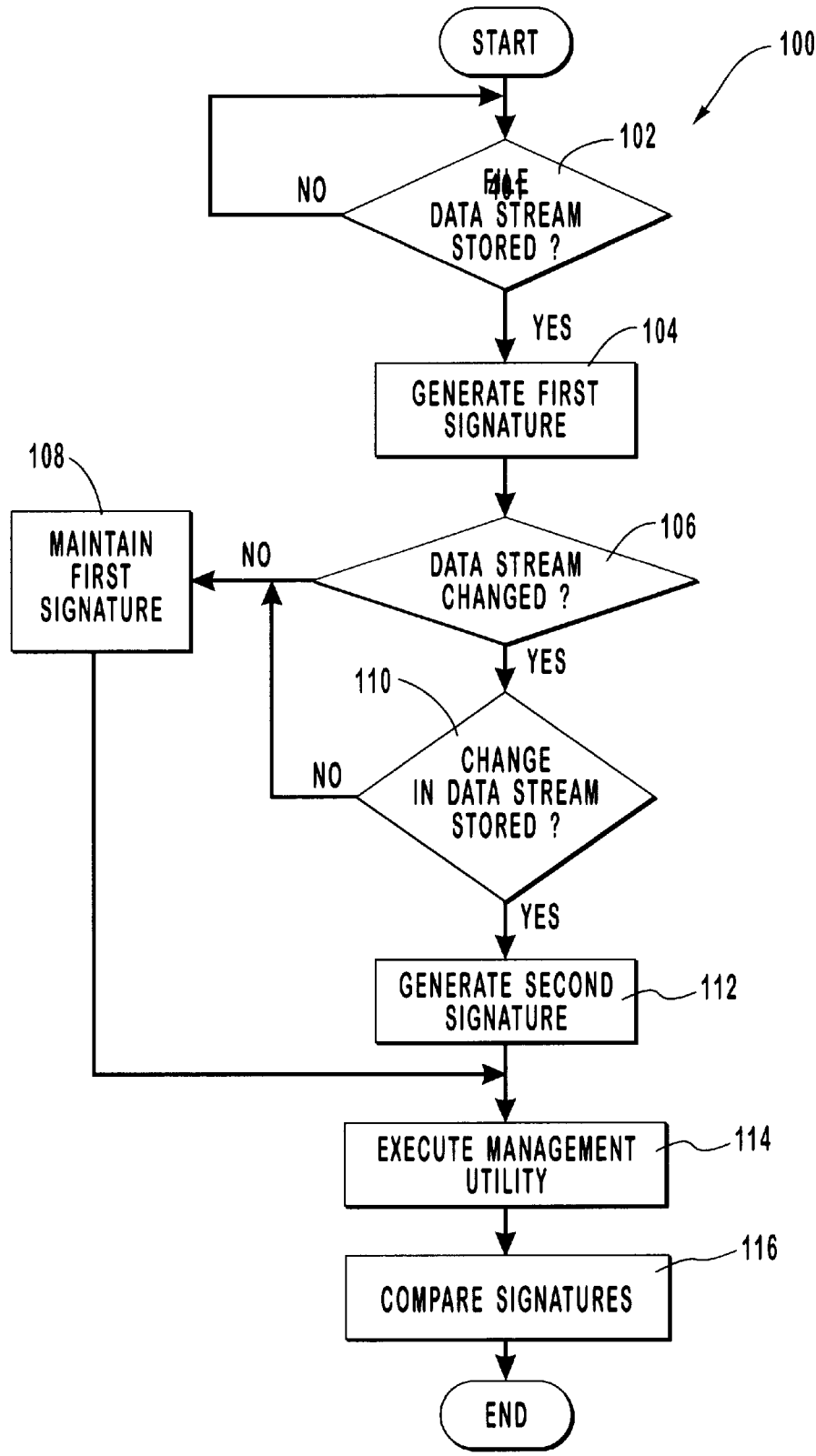
FIG. 2 is a flow diagram of the hierarchical operation of comparing file data streams in accordance with the present invention.

With reference to FIG. 2, a flow diagram depicts a method for comparing between file data streams without requiring any actual comparisons between data streams stored by operation of the file system. The genesis of comparing file data streams 100 begins when an operator is working in a file and the file data stream is stored on a storage medium 102. The file data stream and storage thereof are both well known in the art and may typically include either textual or binary information written to any number of local and remote storage media such as those described previously. Hereinafter, such storage will generically be referenced as being stored on a disk.

After storage of the data stream on the disk, the generation of a first signature 104 that uniquely corresponds to the stored data stream is invoked. It should be appreciated that the signature, as described below, is a smaller size representation of the larger data stream. As the file is further worked on, as part of the same user session or after storing and closing the file and then re-opening the file to continue work, for example, the data stream of the file frequently becomes altered, or changed, 106 as the file is updated. If, for whatever reason, the data stream is not changed, or not stored back onto the disk 110, then the data stream maintains the first signature 108 of the data stream generated in step 104.

If, on the other hand, the data stream is changed and then written back to, and stored on the disk 110, the steps of generating an updated, or second, signature 112 are invoked. At this time two signatures exist corresponding to two different data streams: a first signature corresponding to the originally stored data stream and a second signature corresponding to the changed data stream. What should be appreciated, however, is that both the first and second signatures are much shorter, as described in detail below, than the actual data streams stored by operation of the file system. So that when a determination needs to be effectuated about whether the data streams are the same or different, a more rapid determination can be made by comparing corresponding signatures as opposed to making actual, one-to-one, comparisons of the full length data streams, as is done in the prior art.

It should be further appreciated that data stream comparisons are not performed within file systems merely to compare data, but are typically performed for various contextual reasons involving the execution of other file management utilities. Thus, when a management utility is executed 114, the signatures, corresponding to the data, are compared 116. Typical file management utilities include, but are not limited to, file recover, file replication, content indexing, storage, updating, data redundancy and other similarly related management utilities. Numerous other utilities, now existing and not yet envisioned, also have and will have need for comparing file data streams. It is important to note, however, that while data stream comparisons can effectively be made by performing one-to-one, full length comparisons of the actual data, today's computer applications demand the rapidity and accuracy available from the native data signatures of the present invention.

Figure 2A:
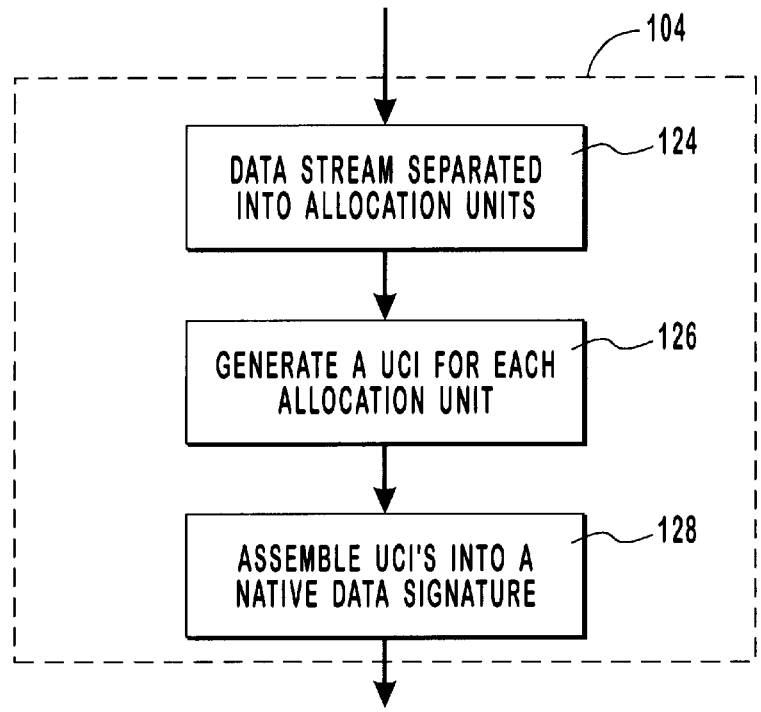
FIGS. 2A and 2B are flow diagrams of generating and updating native data signatures which are invoked by the routine of FIG. 2 comparing file data streams.

With reference to FIG. 2A, the process of generating a signature, a NDS, 104 is invoked when the data stream is stored to a disk 102. The process beings with the data stream being apportioned or separated into allocation units 124 which can be of any size, but which, in one embodiment, range is size from 4K bytes to 256K bytes. The size chosen is typically a function of formatting the disk and may either be specified in size by the user or selected as a default and determined by the computer in an appropriate size. Once allocated, a unique change identifier (UCI) 126 is generated for each allocation unit. The UCIs are a means of distinguishing between allocation units and may take various actual embodiments.

In one embodiment, the UCI is a monotonically increasing means that endures each allocation unit receives its own UCI and that UCIs will never be repeated as time progresses, such as a monotonically increasing time tag or counter. Monotonically increasing means are especially suitable for UCIs because stamping the data stream, via the allocation units, with a monotonically increasing time tag will facilitate the execution of the other management utilities. For example, during user execution of obtaining the latest available version of a file, it is crucial to understand at what time changes took place in the construction of the file. If each allocation unit has a unique and chronological stamp, it is simple matter for the computer to ascertain which version of the file is the latest available. Such further appropriate devices for UCIs are already well known in the art and may include, but are not limited to, update sequence numbers found in database management systems, various clocks, local counters or any other similar means that provides uniqueness to the allocation unit. By using IDs for computers, this can be extended to networks of computers and used in broadcasts made among them. In other words, if each computer on a network has an ID that identifies it, the ID can be made part of the UCI. In this way, an examination of the UCI will identify the computer that generated the UCI. Including a computer ID as part of the UCI can be helpful to sort out conflicts and other issues that arise when employing the invention in a network of computers.

Once the UCIs are generated, the UCIs are assembled into the NDS 128, the unique signature of the data stream. It should be appreciated that each UCI is, preferably, comprised of a series of bits ranging up to, and including, 64 in number. Thus, it should be apparent that while the data stream itself may be extremely large, the NDS is a significantly smaller representation thereof. For example, if the UCIs do in fact range up to 64 bits and the allocation units store data streams in units ranging in size from 4K bytes to 256K bytes, time efficiency is greatly improved when comparing the NDSs. In this example, efficiency is improved on the respective orders of 500:1 and 32,000:1. Consequently, comparisons of data streams by comparing NDSs is overwhelming shorter in time than comparing between actual data streams, one-to-one. Such improvements in time efficiency are always welcomed in the computer industry.

Figure 2B:
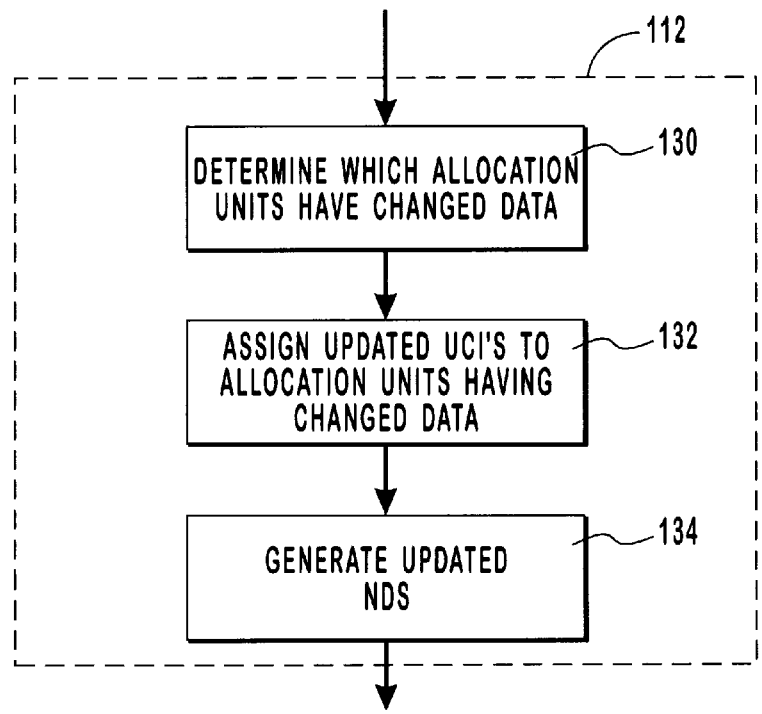

While the foregoing describes specific numeric size preferences for the UCIs, allocation units and NDSs, the particular numbers should not be construed as limiting, but merely as representative. For what remains important is that the signature generated for a particular data stream be of a size that allows for faster comparisons of data instead of having to actually compare the data itself. All variations of data stream signatures embodying this concept are to be considered within the scope of the present invention, be them for a single computer or for a collection of computers in a network With reference to FIG. 2B, the generation of another, or second, NDS 112 is invoked as the data stream is changed, or updated, by the user and stored back to the disk 110. The generation of the second NDS 112 begins by determining the location(s) at which the file data stream, and corresponding allocation unit(s), was changed 130. Next, an update occurs with those allocation unit(s) having a changed data stream therein by assigning updated UCIs 132 to those corresponding allocation units. As before, such updated UCIs may simply be a time tag later in time than the original time tag. Finally, a second, or updated, NDS is generated 134 by altering the previous, or first, NDS corresponding to the original, or first, data stream to accurately reflect the changed data stream. This NDS update is done by replacing the originally assigned UCI(s) with updated UCI(s) that correspond to the changed allocation units. To further illustrate the steps of generating a first and second NDS, reference should now be taken to FIG. 3.

Figure 3:
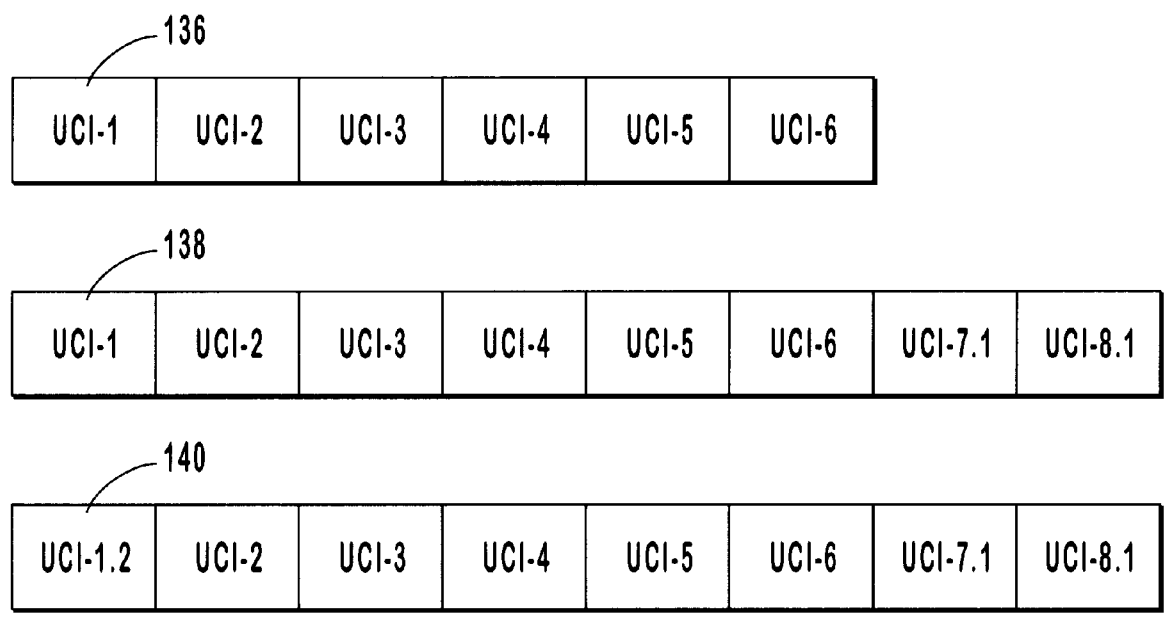
FIG. 3 is a diagram of an exemplary comparison between native data signatures having differing unique change identifiers.

In FIG. 3, a first NDS 136 is illustrated that corresponds to an assemblage of UCIs for a data stream having been separated into six discrete allocation units. Each allocation unit has been assigned a corresponding UCI ranging from UCI-1, UCI-2, and so on up to UCI-6. After an addition of new data to the data stream, an updated or second NDS 138 is generated. The second NDS 138, corresponds to an assemblage of UCIs for the original data stream, separated into six allocation units, plus an additional two allocation units corresponding to the additional new data. It should be appreciated that, in this example, since the first data stream was not changed except for new data being appended thereto, the first portion of the second signature 138 should correspondingly remain unchanged because the underlying data stream is the same. Thus, the second NDS 138 corresponds to assembled UCIs ranging from UCI-1 to UCI-6 then increasing in size from UCI-6 (UCI-n) to some value UCI-8 (UCI-n+x), corresponding to the additional new data. Additionally, since the NDS not only grew in size but was updated at a later time than when the first NDS was generated, an updated UCI is assigned to those allocation units that had a changed data stream therein. As such, the second NDS 138, corresponding to additional new data, is assembled with UCIs ranging from UCI-1, UCI-2 . . . UCI-6 for that portion of the data stream that remained unchanged plus an additional two allocation units for the added data having UCIs with a later time value, UCI-7.1, UCI-8.1.

What should be appreciated is that with an appropriate algorithm, for example, not only can a rapid comparison be effectuated between the first and second NDSs 136, 138 to determine whether the data streams are the same or are different, but that when backing-up the data stream to the disk, the storage only need be done for the last two allocation units, UCI-7.1 and UCI-8.1. Because the first six allocation units have already been stored, valuable storage space is not unduly wasted by restoring them in correspondence with the second NDS. Thus, "extra" storage space provides even further benefit to the exemplary operating system and other management utilities.

It should be further appreciated, in the execution of certain management utilities 114 when at least two data streams are determined to be different, i.e., by comparing NDSs 116, that the process of determining the location(s) at which the change(s) occurred in the actual data is also rapidly performed because the management utility knows in which allocation unit(s) the changes have occurred. As a further illustration, if the data stream were to be modified again, but instead of having additional new data appended to the data stream, a change in the data stream occurred that corresponds to the first allocation unit, a third NDS 140 would be generated. In this example, the third NDS 140 would plainly reflect changes in the data stream by tagging the first allocation unit with a further updated UCI and the assemblage of the UCIs would read from UCI-1.2, UCI-2, UCI-3 through UCI-6, UCI-7.1, UCI-8.1, for example. Then upon rapid comparison, it could be determined that the data stream separated into the first allocation unit is where changes occurred, i.e., from UCI-1 to UCI-1.2. Then, upon an appropriate execution command, tremendous advances in the speed of comparing and updating are realized.

While illustrative UCIs have been described as being a number such as 7 or 7.1, UCIs may additionally be an identification means that enables a rapid method of determining sameness of data streams or for determining which parts of the file need to be stored. Other suitable examples might include, but are not limited to, binary arrangements, characters, letters, time designations or any other suitable means. In addition, while UCIs have been described as being assigned to changed or updated data streams, UCIs could further be assigned simply as periodic flags generated every few seconds by a clock without there first being a change, update or grouping of the data stream. Thus, it should be apparent that the previous description should be construed merely as representation and not limitation.

UCIs may also encode the identify of the computer where the change is made through the use of IDs that identify the computer and other mechanisms. For example, in many networks each computer has a unique ID available that distinguishes it from other computers on the network. This ID may be made part of a UCI. Then by examining the UCI, the computer that made the change can be identified, it will also allow each computer to continue to use a simple counter or other mechanism to generate part of the UCI since a simple counter, when combined with a unique ID creates a unique UCI that will not be confused with any other UCI created by any other computer in the network. Other schemes to assign unique UCIs in a networked environment may also be used. For example, a scheme which allows a UCI to be obtained from a common counter could be used, although for performance reasons, this approach may be undesirable. As another example, blocks of numbers may be allocated to each computer from a common source. The local computer can then assign local UCIs from the allocated blocks as needed. This approach reduces the overhead associated with creating a UCI while still allowing a central counter to be used. However, such an approach may not create any benefits not already obtained by using the computer ID in conjunction with a local counter.

Figure 4:
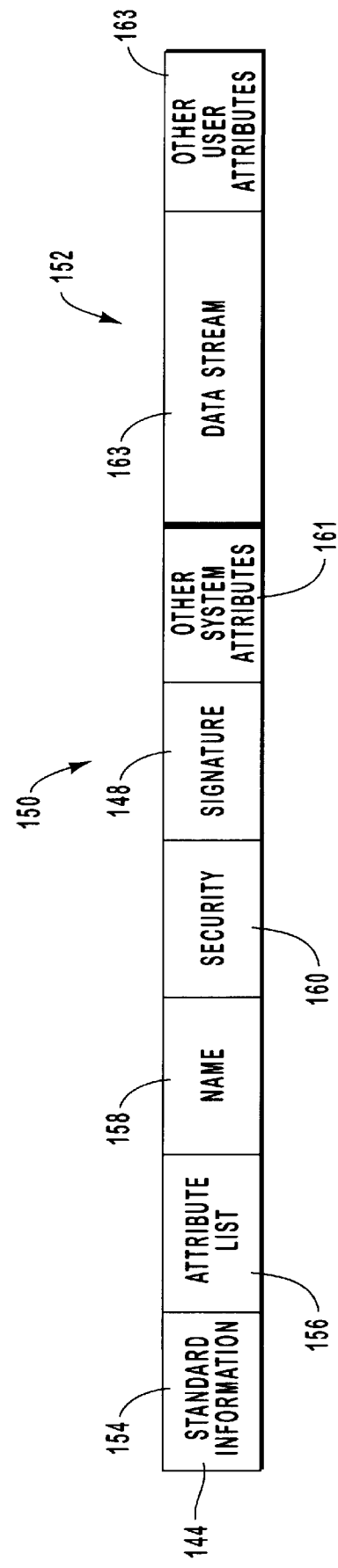
FIG. 4 is an example of how native data signatures may be stored by operation of a file system.

With reference to FIG. 4, an exemplary file suitable for implementing the present invention includes the arrangement of a file 144 as a collection of attributes, of which the data stream 146 and the signature 148 are two such attributes. These attributes depicted represent a modified list of attributes used by the NTFS file system developed specifically for Microsoft Windows NT. The NTFS file system is described in greater detail in *Inside the Windows NT File System,* by Helen Custer, published by Microsoft Press, which is incorporated herein by reference. In FIG. 4, the attributes comprised in the file 144 may be divided into two fundamental groups. The first group containing system attributes, and the second group containing user attributes. In general, system attributes are used to store information needed or required by the system to perform its various functions. Such system attributes generally allow a robust file system to be implemented. The exact number or type of system attributes is generally dependent wholly upon the particularly operating system or particular file system utilized. User attributes, on the other hand, are used to store user controlled data. That is not to say that users may not gain access, under certain circumstances, to one or more system attributes. User attributes, however, define storage locations where a user or client program may store data of interest to the program. In FIG. 4, the system attributes are illustrated generally as 150 and the user attributes are illustrated generally as 152.

System attributes may further comprise, for example, standard information attribute 154, attribute list 156, name attribute 158 and security descriptor attribute 160. Standard information attribute 154 represents the standard "MS-DOS" attributes such as read-only, system, hidden, and so forth. Attribute list 156 is an attribute used by NTFS to identify the locations of additional attributes that make up the file, should the file take up more than one storage record in the master file table. The master file table is the location where all resident attributes of a file or directory are stored. Name attribute 158 is the name of the file. A file may have multiple name attributes in NTFS, for example, a long name, a short MS-DOS name, and so forth. Security descriptor attribute 160 contains the data structure used by Windows NT to specify who owns the file and who can access it. In addition, both the user and system groups 150, 152 have other system and user attributes 161, 163 available for present and future uses. These attributes are also described in greater detail in *Inside the Windows NT File System,* previously incorporated by reference.

Figure 5:
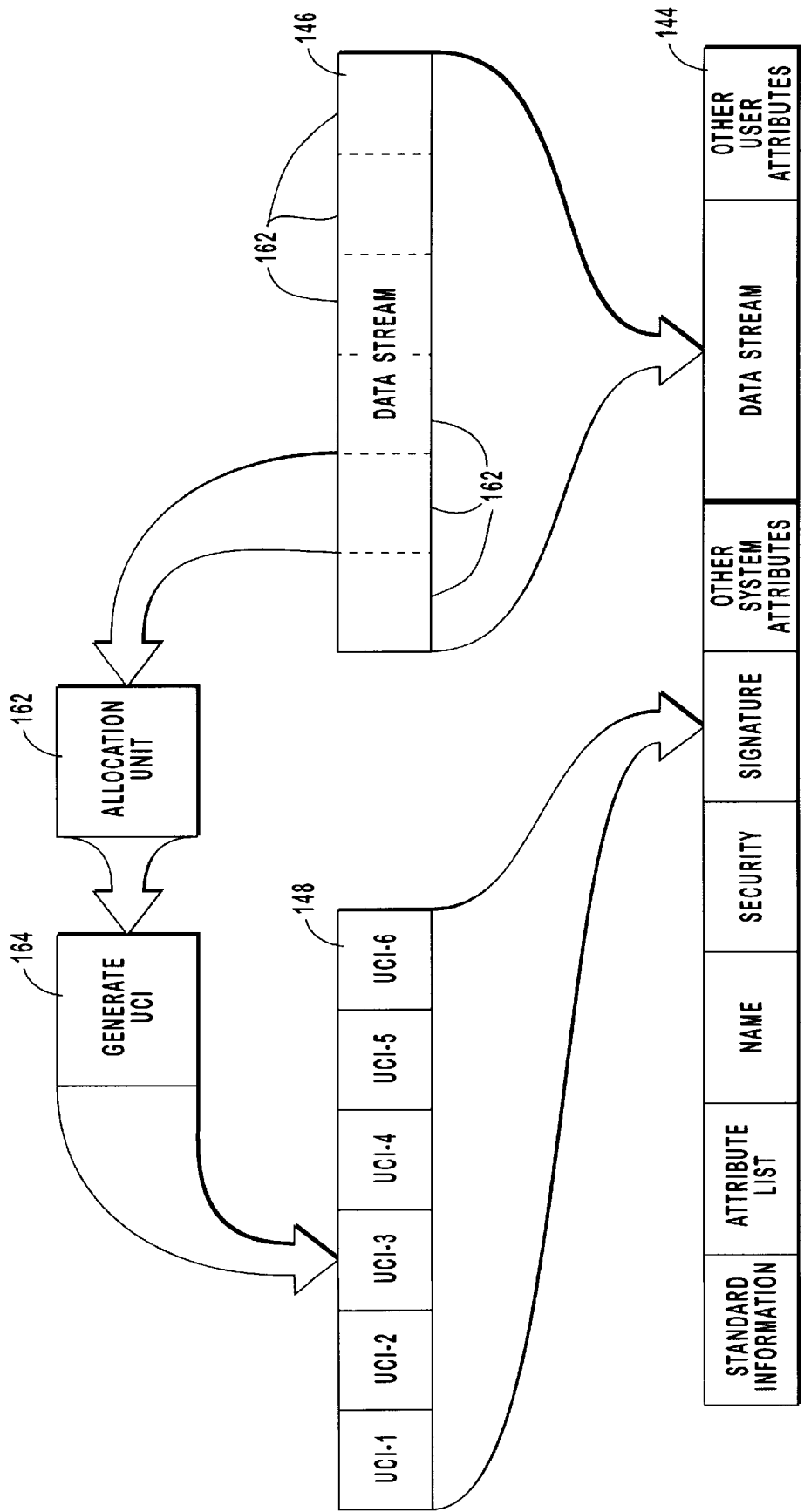
FIG. 5 is a diagram of an exemplary file having a signature attribute generated from a data stream attribute.

In operation, with reference to FIG. 5, a file 144 having attributes like those described has a NDS, the signature attribute 148, generated for the data stream 146 by: (i) separating the data stream 146 into allocation unit(s) 162; (ii) generating a UCI 164 for each allocation unit 162; and (iii) assembling each UCI (six in this example) into the signature attribute 148 of the file 144. In a particular embodiment of NTFS, the signature attribute 148 is designated as $SIGNATURE:StreamName. Such designation, however, should be construed as representative and not as limiting, for the signature attribute could be designated under a myriad of alternatives.

With respect to the detailed description of generating NDSs for comparing data streams as part of a computer-readable medium in relation to the exemplary operating environment of FIG. 1 and the NTFS system of FIGS. 4 and 5, it should be appreciated that the generation of NDSs also has a myriad of alternatives available for efficacious accomplishment. In one embodiment, the system determines the size of the data stream 146 stored on a disk in order to separate the data stream into an appropriate number of appropriately sized allocation units 162. Once allocated, the system then determines how many allocation units were utilized in order to generate a UCI, one per each allocation unit. Means are also preferred that enable each allocation unit to be identified by a UCI having a monotonically increasing time tag applied each time the data stream is changed and stored to a disk. For example, in one presently preferred embodiment of the present invention, the Log Sequence Number (LSN) of NTFS is used as the UCI. In NTFS, the LSN is defined as instances resulting from the numbering of records written to the log file, a system file of NTFS. Alternatively, in another presently preferred embodiment, the Update Sequence Number (USN) of NTFS is used as the UCI. In NTFS, the USN is a monotonically increasing system attribute, which is generated and assigned each time the close operation is performed. LSNs are described in greater detail in *Inside the Windows NT File System,* previously incorporated by reference.

Once each UCI has been generated, the system assembles the resulting UCIs into the NDS 148. Thereafter, the exemplary operating environment determines when changes have occurred in the data stream and, if so, whether those changes have been saved back to the disk. If saved, the system then determines which allocation unit(s) have been affected by the change(s) so that an updated UCI can be applied to each of the changed allocation unit(s). Then a second NDS is generated by combining the updated UCIs with the UCIs associated with the allocation units that were unaffected by the changes made to the data stream. Thence, comparisons can be effectuated between the data streams by comparing the first and second NDSs. In should be appreciated, that the means for comparing the first and second NDSs are typically available as part of the program modules stored on disk, as previously defined, as part of the special or general purpose computer.

In summary, the present invention provides reliable systems and methods for rapidly determining whether data streams are the same, or different, without having to make a comparison between the actual data streams. Moreover, if the data streams are different, the present invention can rapidly determine where the changes between the data streams occur, again, without having to actually compare the entire size of the data streams. Such methods and systems are accomplished by generating a NDS for each data stream stored by operation of the file system, wherein each NDS is substantially smaller in size as compared to the data stream corresponding thereto.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a file system of a computer operating system, a method for comparing data streams, comprising the steps of:
   generating, for a first data stream, a first data signature including a plurality of first unique change identifiers, said first data stream being separated into a plurality of first allocation units, with each of said first unique change identifiers being associated with a different one of said first allocation units;
   generating, for a second data stream, a second data signature including a plurality of second unique change identifiers, said second data stream being separated into a plurality of second allocation units, with each of said second unique change identifiers being associated with a different one of said second allocation units; and
   comparing said first data signature and said second data signature to determine whether said first data stream and said second data stream are the same.

2. A method for comparing data streams as recited in claim 1, wherein the step of generating the first data signature comprises the steps of:
   separating each first data stream into said plurality of first allocation units;
   generating said plurality of first unique change identifiers, one first unique change identifier per first allocation unit; and
   assembling the first unique change identifiers into the first data signature.

3. A method for comparing data streams as recited in claim 2, wherein the step of generating said plurality of first unique change identifiers is conducted using a monotonically increasing means for assigning one of said first unique change identifiers to each of the first allocation units.

4. A method for comparing data streams as recited in claim 2, further comprising the step of creating said second data stream by changing said first data stream, wherein the step of generating the second data signature comprises the steps of:
   generating said plurality of second unique change identifiers, said plurality of second unique change identifiers including:
      at least one second unique change identifier that is the same as a corresponding one of the plurality of first unique change identifiers, each of said at least one second unique change identifier being associated with one of the second allocation units that has not changed with respect to a corresponding one of the first allocation units; and
      at least one new unique change identifier, each of said at least one new unique change identifier being associated with a second allocation unit that includes changed data with respect to the first data stream; and
   assembling said plurality of second change identifiers into said second data signature.

5. A method for comparing data streams as recited in claim 2, wherein the step of generating said plurality of first unique change identifiers comprises the step of stamping the first data stream with a monotonically increasing means when the first data stream is stored to a disk.

6. A method for comparing data streams as recited in claim 2, wherein each of the first unique change identifiers and each of the second unique change identifiers have a size no greater than 64 bits.

7. A method for comparing data streams as recited in claim 2, wherein each of the first allocation units and each of the second allocation units have a size in a range from 4K bytes to 256K bytes.

8. A method for comparing data streams recited in claim 1, wherein the step of generating the first data signature comprises the step of generating said plurality of first unique change identifiers by combining an identifier which uniquely identifies a computer with a locally generated counter.

9. A method for comparing data streams in a file system of a computer operating system, comprising:
   generating a first signature for a first data stream by:
      (i) separating the first data stream into a plurality of first allocation units;
      (ii) tagging each of the first allocation units with a first unique change identifier; and
      (iii) assembling each of the first unique change identifiers into the first signature;

generating a second signature for a second data stream, the second data signature including a plurality of second unique change identifiers, the second data stream being separated into a plurality of second allocation units, with each of the second unique change identifiers being associated with a different one of the second allocation units; and comparing the first and second signatures to determine whether the first and second data streams are identical, including the step of comparing the first unique change identifiers and the second unique change identifiers.

10. A method for comparing data streams as recited in claim 9, wherein the second data stream is the first data stream having changed data, the step of generating the second signature for the second data stream comprising the steps of:

determining which of the second allocation units corresponds to the changed data;

assigning an updated unique change identifier to each of the second allocation units corresponding to the changed data; and altering the first signature by replacing each of the first unique change identifiers that correspond to the second allocation units corresponding to the changed data with the corresponding updated unique change identifier to form the second signature.

11. A method for comparing data streams as recited in claim 10, further comprising the step of storing a first signature attribute that represents the first signature and a second signature attribute that represents the second signature in a first file and a second file, respectively, through operation of the file system.

12. A method for comparing data streams as recited in claim 11, wherein the step of comparing the first and second signatures comprises the step of comparing the first and second signature attributes.

13. A method for comparing data streams as recited in claim 12, wherein the step of comparing the first and second signature attributes comprises the step of comparing the first and second files.

14. A method for comparing data streams as recited in claim 9 wherein each of said first unique change identifiers comprises an identifier of an entity that created said first change identifiers.

15. A computer readable medium having computer executable instructions, said computer-executable instructions comprising:

means for separating said first data stream into a plurality of first allocation units;

means for generating a plurality of first unique change identifiers, one first unique change identifier per first allocation unit;

means for assembling said plurality of first unique change identifiers into a first signature corresponding to said first data stream, said first signature including said plurality of first unique change identifiers;

means for generating a second signature corresponding to a second data stream, said second signature including a plurality of second change identifiers, each of said second change identifiers being associated with a different one of a plurality of second allocation units into which said second data stream is separated; and means for comparing said first signature and said second signature in order to determine whether said first and second data streams are the same.

16. A computer readable medium as recited in claim 15, wherein said computer-executable instructions further comprise means for determining an appropriate size for said first allocation units.

17. A computer readable medium as recited in claim 15, wherein said computer-executable instructions further comprise means for assembling said first and second signatures into first and second signature attributes, respectively, in order to store said first and second signature attributes in a first and second file, respectively, said first and second files having said first and second data streams stored therein, respectively.

18. A computer readable medium as recited in claim 15, wherein said second data stream is said first data stream having changed data therein, said means for generating said second signature corresponding to said second data stream further comprising means for replacing at least some of said fist unique change identifiers in said first signature with updated unique change identifiers in order to form said second signature.

19. A computer program product comprising computer-readable medium having stored thereon computer-executable instructions, said computer-executable instructions including:

means for generating:

for a first data stream, a first data signature including a plurality of first unique change identifiers, said first data stream being separated into a plurality of first allocation units, with each of said first unique change identifiers being associated with a different one of said first allocation units; and for a second data stream, a second data signature including a plurality of second unique change identifiers, said second data stream being separated into a plurality of second allocation units, with each of said second unique change identifiers being associated with a different one of said second allocation units; and means for comparing said first data signature and said second data signature to determine whether said first data stream and said second data stream are the same.

20. A computer program product as recited in claim 19, wherein the means for generating the first signature comprises:

means for separating said first data stream into said plurality of first allocation units;

means for generating said plurality of first unique change identifiers, one first unique change identifier per first allocation unit; and means for assembling the first unique change identifiers into the first data signature.

21. A computer program product as recited in claim 20, wherein the means for generating said plurality of first unique change identifiers comprises monotonically increasing means of assigning one of said first unique change identifiers to each of the first allocation units.

22. A computer program product as recited in claim 20, wherein said second data stream is said first data stream having changed data therein, wherein the means for generating the second data stream comprises:

means for generating said plurality of second unique change identifiers, said plurality of second unique change identifiers including:
- at least one second unique change identifier that is the same as a corresponding one of the plurality of first unique change identifiers, each of said at least one second unique change identifier being associated with one of the second allocation units that has not changed with respect to a corresponding one of the first allocation units; and
- at least one new unique change identifier, each of said at least one new unique change identifier being associated with a second allocation unit that includes changed data with respect to the first data stream; and means for assembling said plurality of second change identifiers into said second data signature.

23. A computer program product as recited in claim 20, wherein the means for generating said plurality of first unique change identifiers comprises means for stamping the first data stream with a monotonically increasing means when the first data stream is stored to a disk.

* * * * *

UNITED STATES PATENT AND TRADEMARK OFFICE
CERTIFICATE OF CORRECTION

PATENT NO. : 5,978,814
DATED : November 2, 1999
INVENTOR(S) : Thomas J. Miller, Luis Felipe Cabrera It is certified that error appears in the above-identified patent and that said Letters Patent is hereby corrected as shown below:

Col. 1, ln. 47: after "allowed for" change "increased" to --increases--

Col. 3, ln. 8: after "only the" change "allocations" to --allocation--

Col. 3, ln. 17: after "back-up the" change "hanged" to --changed--

Col. 4, ln. 27: after "which can" and before "accessed" insert --be-

Col. 5, ln. 18: after "A basic" change "input/out" to --input/output--

Col. 7, ln. 4: after "file" change "recover" to --recovery--

UNITED STATES PATENT AND TRADEMARK OFFICE
CERTIFICATE OF CORRECTION

PATENT NO. : 5,978,814
DATED : November 2, 1999
INVENTOR(S) : Thomas J. Miller, Luis Felipe Cabrera It is certified that error appears in the above-identified patent and that said Letters Patent is hereby corrected as shown below:

Col. 7, ln. 28: after "means that" change "endures" to --ensures--

Col. 7, ln. 39: before "simple matter" insert --a--

Col. 9, ln. 26: after "additionally be" change "an" to --any--

Col. 9, ln. 45: after "can be" change "identified, it" to --identified. It--

Col. 12, ln. 7: after "separating" change "each" to --said--

Col. 14, ln. 18: before "unique change" change "fist" to --first--

Signed and Sealed this

Twenty-eighth Day of November, 2000

Attest:

Attesting Officer

Q. TODD DICKINSON

Director of Patents and Trademarks